Nov. 11, 1969  L. K. LUGTEN  3,478,291
MAGNETIC CORE AND COIL ARRANGEMENT
Filed Aug. 8, 1968
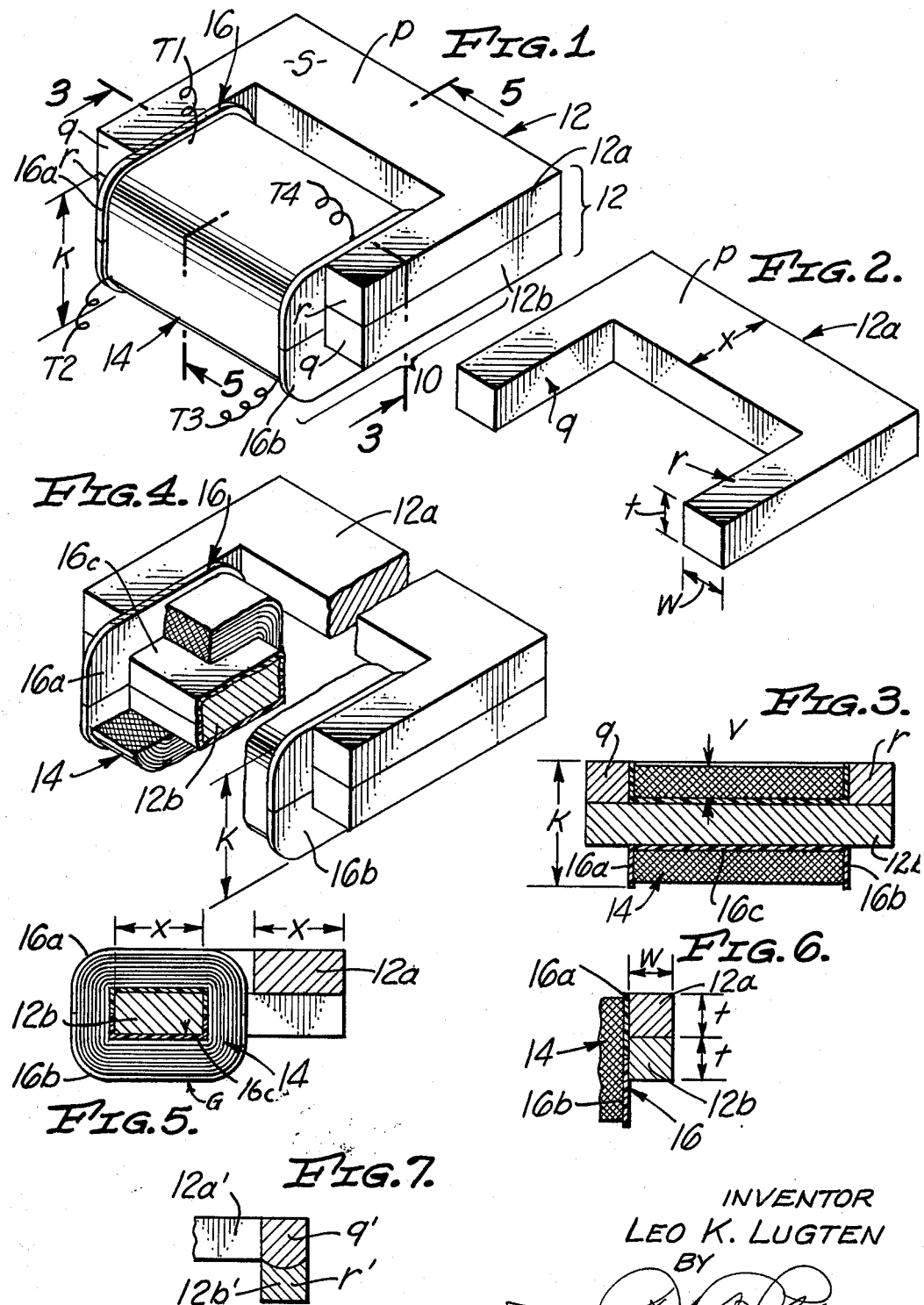
INVENTOR
LEO K. LUGTEN
BY

United States Patent Office 3,478,291
Patented Nov. 11, 1969

---

3,478,291
MAGNETIC CORE AND COIL ARRANGEMENT
Leo K. Lugten, Riverside, Calif., assignor to Bourns, Inc., a corporation of California
Filed Aug. 8, 1968, Ser. No. 751,157
Int. Cl. H01f 27/24
U.S. Cl. 336—216                    3 Claims

ABSTRACT OF THE DISCLOSURE

An inductive device, such as an inductance or transformer, especially suitable in high frequency electric pulse signal operations and replacing toroidal-core inductive devices, characterized by low elevational profile, high efficiency, ease of providing electrostatic shielding of core from winding, and inexpensive construction, the core providing an efficient complete magnetic flux circuit and the core being comprised of two substantially identical U-cores of uniform thickness and superimposed to form a core of rectangular plan form and whose sides and ends are of like cross-sectional area and one end of which core bears a flat winding of rectangular configuration wound thereon of thickness not in excess of the thickness of either leg of either U-core, whereby the inductive device is of thickness not in excess of about three times the thickness of said flat winding.

---

This invention has as its principal object to provide an electromagnetic inductive device such as an inductance or transformer, which device is of high efficiency, inexpensive to manufacture, flat and thin to permit direct attachment to circuit boards, and which is easy to wind and to provide with electrostatic shielding of core from winding, and which device is especially adapted for use in translation and other operations with high frequency electric pulses.

In prior practice, inductive devices such as transformers and inductances adapted for operations with high-frequency electric pulse signals have been comprised of toroidal cores carrying one or more conductor windings. Such toroidal cores are of a ring-like configuration, and when wound provide a flat unit of low elevational profile adapted to be mounted on circuit boards without requiring more than a small space upward or above the face of the board. Such cores, usually made of one or another of the ferrite compositions, provide a unitary, continuous, magnetic flux path. However, use of toroidal cores is not without inescapable undesirable disadvantages. For example, applying windings is difficult and tedious; and the windings cannot be of neat and efficient form since the inner reaches of the turns or coils of the winding have less circumferential space than do the outer reaches. Thus the inner reaches of the turns pile up on the inside of the annulus of the core, and the outer reaches of the turns spread out on the outside of the annulus, with the interconnecting upper and lower reaches or bights relatively haphazardly disposed across the upper and lower curved faces of the core. The latter arrangement, together with the fact that it is impractical to wind a toroidal core by machine without leaving a relatively large vacant space at the center of the wound structure, renders the magnetic circuit ineffiecient in that flux leakage paths are large. As is clearly evident, a previously-wound coil, such as a transformer primary or secondary coil, cannot be applied to a toroid core, since the latter is an endless ring. The coil must be wound in situ by threading each turn of the winding in successive order through the opening of the toroid. And, since the windings cannot be close-packed, even in the case of a single-layer winding, the space-utilization efficiency of a toroidal inductor or transformer is low as compared with that of an inductive device using close-packed windings.

The present invention, by utilizing two individual U-cores of identical or substantially identical construction and dimensions, and of a particular configuration and with closely mating extensive juxtaposed surfaces, and by use of a winding means comprising one or more windings or coils which winding means is of a particular configuration relative to a thickness of either of the U-cores, provides an inductive device, which may alternatively be an inductance or a transformer, and which device has the highly desirable low elevational profile of a comparable toroidal device but has none of the aforementioned disadvantages of a toroidal device and concurrently is characterized by greatly reduced flux leakage, much higher winding efficiency, ease of winding, and is relatively inexpensive. Further, the present invention is such as to easily and readily accommodate provision of an air-gap of any desired gap-dimension in the magnetic circuit loop comprising the superposed cores. Provision of such a gap is impractical or impossible in the case of conventional toroidal cores. The theoretical and practical considerations relative to the effects of provision of an air gap in a magnetic circuit are discussed in standard texts; for example, at pages 134–135 of the text "Transformers for Electronic Circuits" authored by Nathan R. Grossner and published in 1967 by McGraw-Hill Book Co., New York, N.Y.

These and other features and advantages of the novel inductive device will be made fully evident hereinafter in this specification.

As hereinbefore indicated, it is a principal object of the invention to provide improvements in inductive devices such as inductances and transformers and more particularly in such devices which are of very small size of the order of a small fraction of an inch in greatest dimention and which are especially adapted for incorporation in high-frequency electric pulse signaling apparatus or circuits. Such devices are desirably thin in the top-to-bottom dimension (that is, of low elevational profile), whereby to permit close stacking of etched-circuit boards on which the devices and other electronic circuit components are mounted. The present invention overcomes the objectionable features of toroidal-core inductive devices such as pulse transformers, while accomplishing the object of provision of an equivalent device of equally small dimensions, as well as the other aforementioned objects. The invention is explained in connection with the exemplary embodiment in the form of a pulse transformer in the accompanying drawings in which:

FIGURE 1 is a pictorial representation of the preferred exemplary embodiment of the invention, in the form of a pulse transformer, on enlarged scale;

FIGURE 2 is a pictorial representation of one of the core pieces or members of the transformer depicted in FIGURE 1, with indications of dimensions;

FIGURE 3 is a sectional view of structure depicted in FIGURE 1, the section being as indicated by line 3—3 in FIGURE 1;

FIGURE 4 is a fragmentary view of structure depicted in FIGURE 1, the sections being taken variously to illustrate details of construction of the exemplary transformer;

FIGURE 5 is a sectional view of parts depicted in FIGURE 1, the section being taken as indicated by line 5—5 in FIGURE 1;

FIGURE 6 is a fragmentary sectional view of parts shown in FIGURE 1, depicting the juxtaposed relationship of legs or limbs of core members depicted in FIGURE 1, and indicating certain dimensions; and FIGURE 7 is a cross-sectional view illustrating the structural relationship of superposed U-core limbs of a modified form usable in place of U-core members shown in FIGURE 1.

In FIGURE 1, the transformer, denoted generally by number 10, comprises a core means 12 comprising upper and lower core pieces or members 12a, 12b, respectively, in juxtaposed relation more specifically explained hereinafter, and a coil or winding means denoted generally by 14. The core members 12a and 12b are preferably but not necessarily substantially identical, and as depicted in FIGURE 2, each is of what is for convenience termed U-shape and comprises a pair of legs or limbs q, r, interconnected by and integral with a bridge p. The core members are of magnetic material such as a ferrite, chosen for specific known characteristics in accord with known principles of design and depending upon the use to which the device is to be applied.

As indicated in FIGURES 1, 3, 4 and 5, the two core members are juxtaposed, with mating surfaces of limbs in contact and with bridges opposed, to provide a substantially closed magnetic loop. The mating surfaces of the limbs of the cores are lapped, whereby magnetic reluctance of the magnetic loop may be minimized or reduced to the lowest practicable level by permitting the air-gap to be reduced to a minimum value. The mating surfaces of the limbs of the cores are held in place in juxtaposed relationship, for example as illustrated in FIGURES 1 and 6, by any suitable means but preferably by adhesive (which due to the extreme thinness of the "glue line" is not shown in the drawings).

Prior to being joined with core member 12a, core member 12b has applied thereto an insulation longitudinally-split bobbin or spool 16, which comprises end flanges 16a and 16b and a central portion 16c which closely engages the bridge of the core member, all as indicated in FIGURES 1, 3, 4 and 5; and further, core member 12a has wound thereon between the end flanges of the bobbin, inductive coil means which may comprise a single inductance coil or may, as depicted or indicated in FIGURE 1, comprise a transformer primary and a transformer secondary. The windings or coils have terminations (terminals) T1, T2 and T3, T4, respectivley. As is evident, winding of the coil means on the open core member 12b is much easier and more economically performed than would be the case if the core were a closed toroid. Following winding of the coils of winding means 14, the second core member 12a is added to the assembly comprising core 12b and the winding means, by simple superposition of the legs of core 12a on the legs of core 12b.

As is evident, if a finite predetermined extent of air-gap is desired in the magnetic circuit, as may be desired to increase pulse permeability or to offset the influence of D.C. polarization by either a train of asymmetrical pulses or a D.C. flowing through one or more windings, such an air-gap may readily be provided by interposing non-magnetic spacer means between the superposed core legs.

The presently-described inductive device attains a low elevational profile, or height, in part by so proportioning the limbs and bridge of each of the cores that when the limbs of one core are superposed in the illustrated juxtaposition on the respective limbs of the other core, a magnetic flux loop or path of substantially uniform right cross-section is provided, and by forming the cores of a thickness or height $t$ approximately equal to the width $w$ of each core limb, and in part by forming the coil around one core-bridge and of total thickness not in excess of about three times the core thickness. Thus with the thickness of either core represented by $t$ (FIGURES 2 and 6), the width of either of the limbs by $w$, and the width of either of the core bridges by $x$, the relationships are that the area of the right cross-section of the two superposed core limbs ($2wt$) is substantially equal to the area of the right cross-section of the core bridge ($xt$), that is, $2wt \approx xt$; and that the depth of the winding measured outward from a core bridge is not in excess of the thickness ($t$) of a core, whereby the total height or thickness $k$ (FIGURE 1) of the winding means is not in excess of about three times the thickness $t$ of a core. In this specification, thickness is measured in the direction indicated by the dimensions $t$ and $k$ in FIGURES 1 and 2; that is, in the direction of the height of the device when it is lying flat on face S of core member 12a (FIGURE 1). Thus it is noted that the total thickness of the device as depicted is substantially equal to twice the depth of the winding plus the thickness of a core, which provides the low elevational profile desired and substantially the same as an equivalent toroidal device; and thus the device is adapted to be used in place of the equivalent toroidal device on flat etched-circuit boards without increasing the inter-board spacing in circuit or system modules or frames.

It is made evident in the drawings that due to the relatively wide bridge (of width $x$), and the relatively flat winding resulting from forming the winding or coil means on the bridge portion $p$ of a core, the mating superposed surfaces of the two core members are of large extent, which provides a very large area for core-to-core transfer of magnetic flux. As illustrated, that area is, at each juncture or air-gap location, approximately equal to twice the width $x$ of either bridge plus the winding depth G (FIGURE 5), multiplied by the widow $w$ of either core limb. As a consequence, when the core limbs are tightly pressed together and maintained in that status as by adhesive, potting means, or the like, the magnetic reluctance of the flux path around the flux-path loop is not greatly in excess of the reluctance of a continuous or one-piece ring core of comparable dimensions.

As is evident to those skilled in the art, the depth of winding means 14 need not be as great as the core thickness $t$; and also the length of the winding means may vary in dependence upon the number of wire turns required, and upon wire dimensions or sizes required. As illustrated, the entire capacity of the bobbin 16 is occupied by windings or coils, but such need not be the case.

In FIGURE 7, there is depicted in fragmentary cross-section, a modified form of core members whose mating surfaces are not flat and whose limbs are of complementary cross-section such as to increase the total area of mutual contact whereby the reluctance of the air gap (which is inversely proportional to the area of mutual contact of the limbs of the U-cores) is decreased. As is evident, other shapes of mutually contacting limb surfaces having areas greater than that provided by flat mating surfaces, are feasible in reducing the reluctance of the air gap to a minimum value.

In FIGURE 7 the reference numerals correspond with those directed to similar portions of cores 12a and 12b, but bear primes to indicate the modified forms.

The preceding description of an exemplary preferred inductive device incorporating the invention and illustrated to greatly enlarged scale in the drawings makes it evident that the aforementioned objects have been attained.

I claim:
1. An inexpensive highly efficient inductive device of low elevational profile adapted for flat mounting on circuit boards, said device comprising:
  first means, including first and second ferrite U-cores each substantially identical to the other and each having first and second limbs integral with a limb-connecting bridge and said first U-core having its first limb superposed upon said second limb of said second U-core and its second limb superposed upon said first limb of said second U-core and said superposed limbs having complementary juxtaposed faces capable of very close fit over at least a major portion of the areas of such juxtaposed faces whereby to provide capability of an extensive core-to-core flux-transfer path of minimum reluctance between the respective juxtaposed faces of said cores, and said bridge of either core being in cross section at least about twice as wide as high and of right cross-sectional area at least about equal to the combined right cross-sectional areas of two superposed core limbs, whereby to form a closed-loop ferrite flux path encircling an open space; and second means, including flat electrical coil means disposed on and closely fitting the bridge of one of said U-cores, said coil means comprising a plurality of conductor turns each having two long reaches interconnected by two short reaches to form a coil means having two ends and two long sides and two short sides, said coil means having its long sides disposed generally parallel to the upper and lower faces of the U-core bridge on which it is disposed and having one of the short sides thereof including respective short reaches of said conductor turns extending through said open space encircled by said superposed U-cores, and the thickness of said coil being no greater than the thickness of a limb of either of said U-cores;

whereby to provide an inexpensive inductor of low profile with minimum magnetic flux leakage and of high efficiency.

2. An inductive device according to claim 1, in which said electrical coil means comprises a transformer primary winding and a transformer secondary winding.

3. An inductive device according to claim 1, in which said closely-fitting juxtaposed faces of said superposed U-core limbs are lapped mating curved surfaces which thereby are adapted to be in extremely close contact with each other over the entire extent of said limbs and provide minimum reluctance of air gap therebetween.

References Cited

UNITED STATES PATENTS 2,316,928    4/1943    Woodward _____ 336—234 XR

FOREIGN PATENTS 151,310    7/1951    Australia.
624,767     1949     Great Britain.

LEWIS H. MYERS, Primary Examiner

T. J. KOZMA, Assistant Examiner

U.S. Cl. X.R.
336—212, 221